United States Patent [19]

Twickler

[11] 4,176,733

[45] Dec. 4, 1979

[54] COMBINATION NO-BACK BRAKE AND TORQUE LIMITER ASSEMBLY

[75] Inventor: Robert G. Twickler, Rockford, Ill.

[73] Assignee: Sundstrand Corporation, Rockford, Ill.

[21] Appl. No.: 900,314

[22] Filed: Apr. 26, 1978

[51] Int. Cl.² ............................................. B60T 7/12
[52] U.S. Cl. ................................... 188/134; 192/8 R
[58] Field of Search ................. 188/134, 135; 192/7, 192/8 R

[56] References Cited

U.S. PATENT DOCUMENTS

| 3,285,377 | 11/1966 | Rasmussen | 188/134 X |
| 3,499,511 | 3/1970 | Bouhout | 192/7 X |
| 3,542,162 | 11/1970 | Kerr et al. | 188/134 |
| 3,596,740 | 8/1971 | Nau | 188/134 |
| 4,030,578 | 6/1977 | Cacciola et al. | 188/134 |

Primary Examiner—Duane A. Reger
Attorney, Agent, or Firm—Wegner, Stellman, McCord, Wiles & Wood

[57] ABSTRACT

A combination no-back brake and torque limiter assembly including an input shaft and an output shaft and with a brake including interleaved brake plates associated with the output shaft and with the brake plates normally spring-urged into pressure engagement, when there is no drive of the input shaft, to prevent rotation of the output shaft to provide the no-back brake operation. Torque-responsive structure connected between the input and output shafts senses input shaft torque to initially cause release of the pressure engagement of the brake to permit rotation of the output shaft and also senses a maximum torque condition to re-engage the brake for torque limiting operation.

14 Claims, 8 Drawing Figures

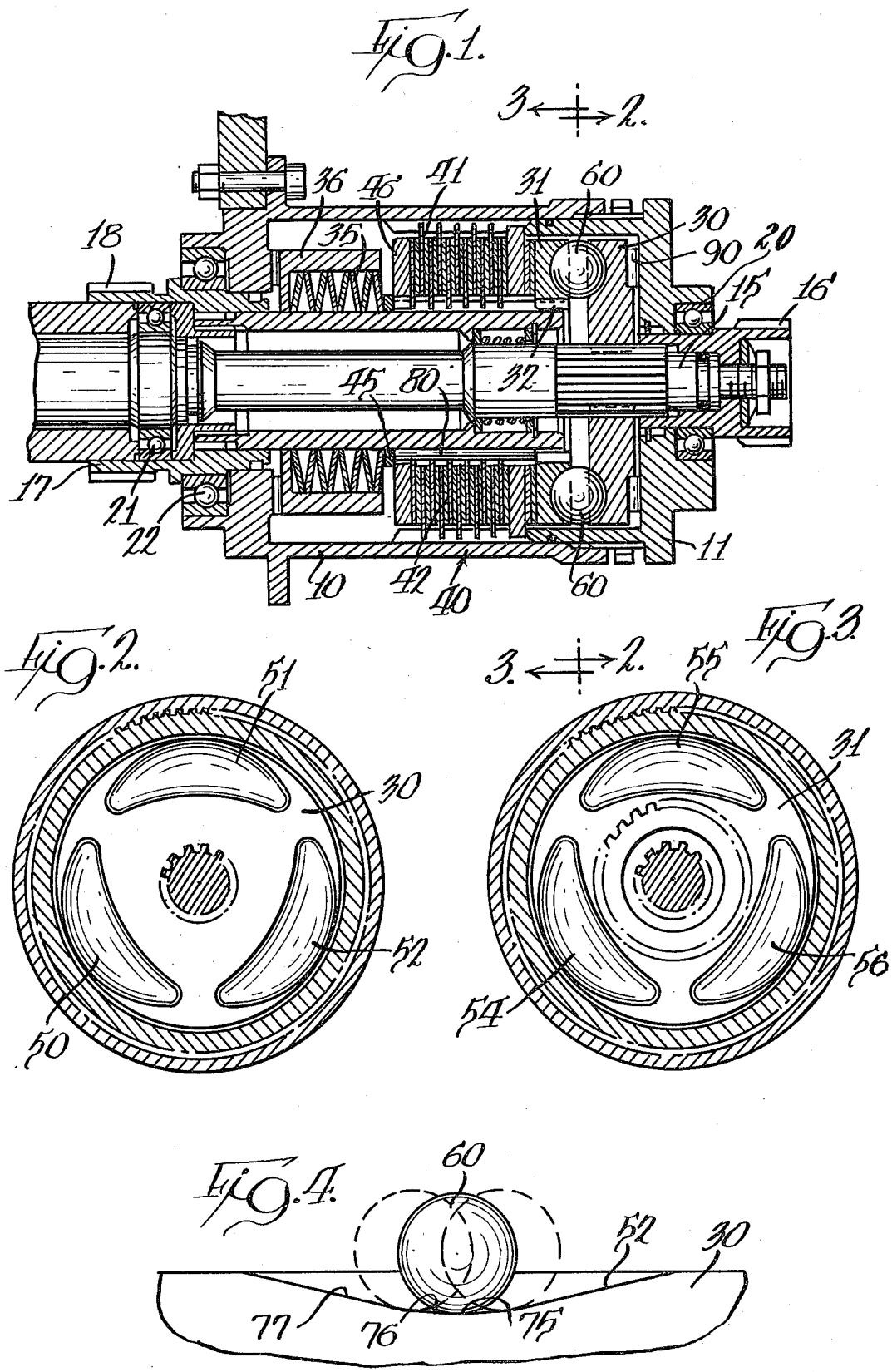

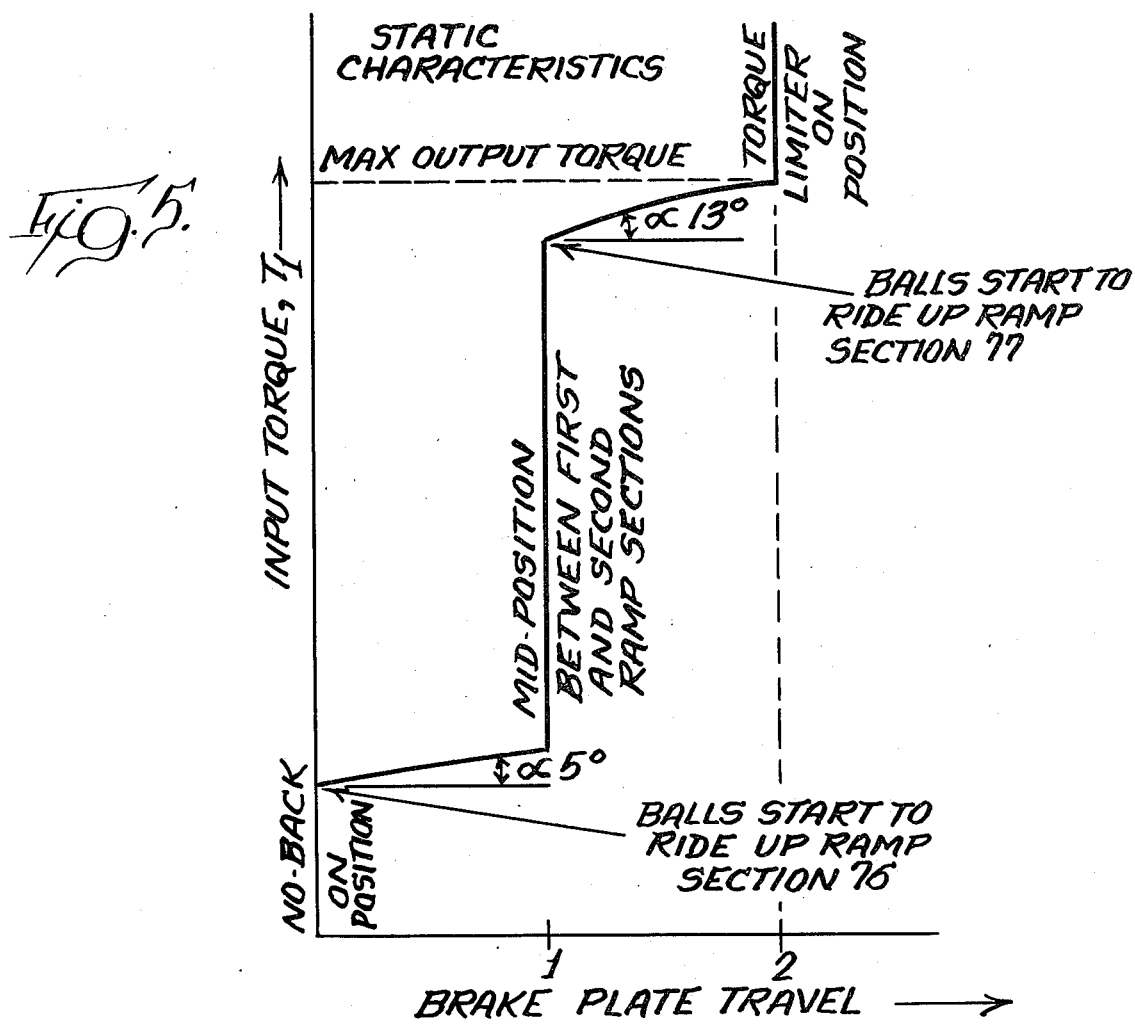
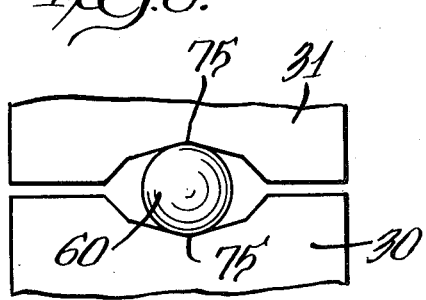
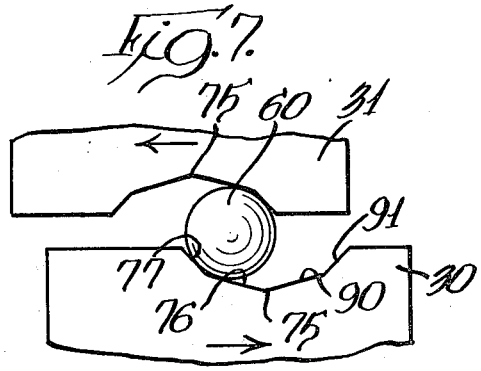
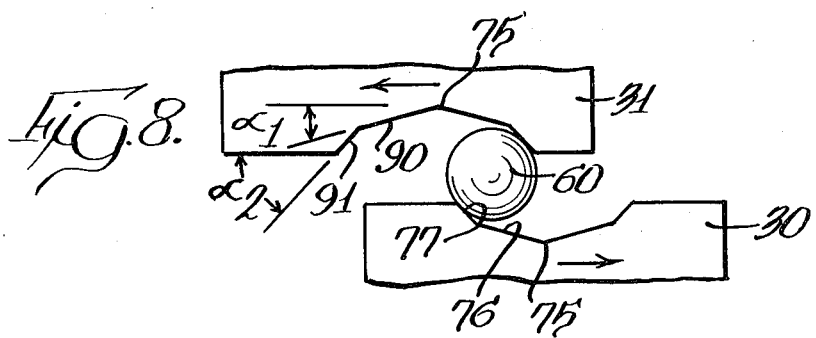

COMBINATION NO-BACK BRAKE AND TORQUE LIMITER ASSEMBLY

BACKGROUND OF THE INVENTION

This invention pertains to an assembly utilizing a single brake which functions to provide no-back brake operation as well as torque limiting operation, with the brake being progressively released intermediate the aforesaid two conditions to permit non-braked rotation of the output shaft.

There are many drive systems wherein it is desired to brake an output shaft against rotation until power is supplied to an input shaft operatively connected to the output shaft. It is known to associate a brake with such structure which will hold the output shaft against rotation and which will automatically release upon sensing input torque. It is also known to have mechanism including a brake which will limit the amount of torque transmitted from an input shaft to an output shaft.

The prior mechanisms have performed either the no-back brake operation or the torque limiting operation, but have not accomplished both by use of the same brake.

SUMMARY OF THE INVENTION

A primary feature of the invention disclosed herein is to provide a combination no-back brake and torque limiter assembly which utilizes the same brake for accomplishing no-back braking as well as torque limiting braking.

In various types of actuators, such as an actuator for aircraft components, it is necessary to have structure to perform no-back braking of the drive train as well as limiting the applied torque. In such installations, the space and weight requirements are limiting and with the structure disclosed herein both types of brake operation are accomplished by use of a single brake and, more particularly, by the use of a single set of brake elements or plates which provide both braking functions.

An object of the invention is to provide an assembly for transmitting a drive from an input shaft to an output shaft which is responsive to torque and for also holding the output shaft against rotation when there is no input shaft torque comprising, a brake for the output shaft, means for normally applying the brake to hold the output shaft against rotation and for progressively releasing the brake upon establishment of a torque difference between the input and output shafts, and means for applying the brake as the applied torque approaches a maximum value.

Still another object of the invention is to provide a combination no-back brake and torque limiter assembly having a casing with input and output shafts rotatably mounted therein, a pair of discs mounted one on each of said shafts, with faces in opposing relation, a brake with interleaved brake elements associated with the output shaft including a first series of brake elements fixed to the casing and a second series of brake elements keyed to the output shaft, spring-urged means acting against the brake elements urging them toward the output disc to maintain the elements in pressure engagement for the no-back brake operation, each of said discs have at least one ramp with a ball positioned therebetween and with the ramps having a bottom to receive the ball in a no-back brake operation, said ramps have a first inclined section acting in response to input torque to increase the space between the discs by shifting the output disc to act against the spring-urged means and release the pressure engagement of the brake elements, and said ramps have an additional inclined section acting to further increase the space between the discs and cause the output disc to exert pressure engagement on the brake elements for the torque limiting operation.

BRIEF DESCRIPTION OF THE DRAWING

FIG. 1 is a central, vertical section through the combination no-back brake and torque limiter assembly;

FIG. 2 is a vertical section, taken generally along the line 2—2 in FIG. 1;

FIG. 3 is a vertical section, taken generally along the line 3—3 in FIG. 1;

FIG. 4 is a transverse section, taken generally along the line 4—4 in FIG. 2;

FIG. 5 is a graph showing the static characteristics of operation with input torque plotted against brake plate travel;

FIG. 6 is a diagrammatic view of the torque-responsive structure positioned in no-back brake operation;

FIG. 7 is a view, similar to FIG. 6, showing the torque-responsive structure in null position with the brake released; and FIG. 8 is a view, similar to FIG. 6, showing the torque-responsive structure in torque limiting position.

DESCRIPTION OF THE PREFERRED EMBODIMENT

The assembly has a casing 10 with an end closure member 11 which houses an elongate input shaft 15 having an input gear 16 and a tubular output shaft 17 having an output gear 18. The input shaft is rotatably mounted at one end by a bearing 20 in the end closure member 11 and a bearing 21 carried by the tubular output shaft 17. The latter shaft has a casing mounted bearing 22.

An input disc 30 is keyed to the input shaft 15 and is mounted in opposing relation to an output disc 31 having a central opening to provide for keying thereof, as indicated at 32, to the output shaft 17. The output disc 31 is urged toward the input disc 30 by spring means 35 in the form of a series of disc springs which surround the output shaft and are confined within a cup-shaped member 36 rotatable with the output shaft. This spring means acts through a brake, indicated generally at 40, to urge the output disc 31 toward the input disc 30.

The brake 40 has a series of brake elements in the form of annular plates associated with the casing 10 and the output shaft 17. More specifically, a first series of plates 41 have their outer periphery keyed to the interior of the casing while a second series of plates 42 are interleaved with the first series and have their inner periphery keyed to the exterior of the output shaft. The brake plates have pressure pads provided on the adjacent faces thereof.

The spring means 35 reacts at one end against the base of the cup-shaped member 36 and at the other end against a ring 45 which abuts an end brake plate 46 keyed to the casing and which exerts pressure engagement on all of the interleaved brake plates and through to the output disc 31.

With the parts positioned as shown in FIG. 1, the input disc 30 and output disc 31 are relatively close to each other and the brake plates are in pressure engagement to provide the no-back brake operation.

Upon delivery of input torque by the input shaft 15, torque sensing means are operative to control the condition of the brake 40. This torque sensing means includes several pairs of ball ramps provided on the adjacent faces of the input and output discs. All of the ramps are of the same configuration, with the input disc 30 having the ramps 50, 51, and 52 which form pairs with ramps 54, 55 and 56, respectively, of the output disc 31. Each pair of ramps has a ball 60 positioned therebetween.

All of the ramps, as viewed in plan, are curved to have a contour following the curved path of a ball as a ball moves in response to relative movement between the discs. Additionally, each of the ramps has the same longitudinal contour, as shown for the ramp 52 in FIG. 4. The ramp has a slightly curved bottom 75 whereby a ball 60 is positioned against the bottoms of a pair of ramps to provide minimum spacing between the discs 30 and 31. The ramp then has a first inclined section 76 which, in a preferred embodiment, is at an angle of approximately 5° to the face of the disc, followed by a second inclined ramp section 77 which is at a greater angle. In a preferred embodiment, this greater angle is approximately 13°. The ramp sections are gradually curved into the adjacent part of the ball ramp.

Referring particularly to FIGS. 6-8, the no-back brake operation is shown in FIG. 6. Input torque is transmitted by the input shaft 15 to the input disc 30 and from the ramps 50-52 thereof through the balls 60 to the output disc ramps. The torque difference sensed by the input and output discs with their ramp and ball structure is vectorially changed into an axial force as the torque is transmitted to the output shaft 17 by movement of the balls 60 onto the ramp sections 76. This acts to initially reduce the axial pre-load caused by the spring means 35 and, at the end of the ramp sections 76, the brake has been moved to a null position where there will be no torque resistance by the brake.

This movement of the output disc is longitudinal of the output shaft 17, as permitted by the key relation therebetween, and is transmitted to the spring-urged ring 45 by a series of motion-transmitting pins 80 around the output shaft and which extend lengthwise thereof and engage between the ring 45 and a face of the output disc 31.

With the discs related as shown in FIG. 7, the brake 40 is completely released. As the torque increases toward a predetermined maximum value, the balls 60 will move onto the second ramp sections 77 and progressively therealong to increase the spacing between the discs and shift the brake structure toward the left to have the end brake plate 46 engage against an end of the cup-shaped member 36 defining a reaction means for the brake structure in torque limiting operation. This disc movement, at the same time, acts through the motion transmitting pins 80 to further compress the spring means 35. With the parts positioned as shown in FIG. 8, the brake is fully active to limit the torque.

These various stages of operation are shown in FIG. 5 with the ball ramp section angles given as preferred values, but not as required values.

The direction of rotation of the input shaft 15 has been shown as to the right in FIGS. 7 and 8. However, if shaft rotation were reversed, there are additional ramp sections 90 and 91 functioning the same as ramp sections 76 and 77, respectively, in the opposite direction of shaft rotation.

All of the forces acting longitudinally of the assembly are applied against the input disc 30 and a bearing 90 is positioned between the input disc 30 and the end closure member 11 to permit free rotation of the input disc.

The casing 11 has hydraulic fluid therein to dissipate heat generated by the brake 40.

I claim:

1. A combination no-back brake and torque limiter assembly comprising, a casing, a rotatable input shaft, a rotatable output shaft, a pair of opposing discs rotatably connected one to each of the input and output shafts, brake means associated with the output shaft including at least spaced-apart brake elements carried by the casing and interleaved brake elements therebetween and rotatable with the output shaft, spring means urging the brake elements toward the disc on the output shaft and into no-back braking pressure engagement, means including interacting elements between said opposing discs to increase the space therebetween for acting on the spring means to reduce the pressure engagement of the brake means and then release pressure engagement upon creation of a predetermined torque difference between the input and output shafts, and means including said interacting elements between said opposing discs for further increasing the space between said discs and acting on the spring means and exerting force on the brake means to obtain torque limiting braking pressure engagement as the torque applied to said input shaft approaches a maximum value.

2. A combination no-back brake and torque limiter assembly comprising, a rotatable input shaft, a rotatable output shaft, a pair of opposing members rotatably connected one to each of the input and output shafts, brake means associated with the output shaft including at least a pair of spaced-apart fixed brake elements and a single brake element therebetween and rotatable with the output shaft, means urging the rotatable brake element into no-back braking pressure engagement with one of the fixed brake elements, means including interacting elements between said opposing members to increase the space therebetween for reducing and then releasing the pressure engagement upon creation of a predetermined torque difference between the input and output shafts, and means including said interacting elements between said opposing members for shifting said rotatable brake element into torque limiting braking pressure engagement with the other of the fixed brake elements as the torque applied to said input shaft approaches a maximum value.

3. An assembly as defined in claim 1 wherein said brake means has a plurality of brake elements interleaved between fixed brake elements.

4. An assembly as defined in claim 2 wherein said opposing members comprise a pair of discs with adjacent faces thereof having opposed ball ramps with a ball positioned therebetween, each of said ramps having a bottom, and a pair of successive ramp sections at different angles to the face of the disc.

5. An assembly as defined in claim 4 wherein said discs have their ramp bottoms in alignment and the ball positioned therein when there is zero or low torque transmitted between the shafts to have brake pressure engagement, said ball moves onto the first ramp sections to progressively move the discs apart and progressively release brake pressure engagement with complete release when the ball is at the end of the first ramp sections, and said ball causing further movement apart of said discs as the ball moves along said second ramp sections and with reapplication of brake pressure engagement with full pressure engagement as the ball reaches the end of said second ramp sections.

6. An assembly as defined in claim 5 wherein said first ramp sections have an angle of approximately 5° to the face of the discs and the second ramp sections have an angle of approximately 13° to the face of the discs.

7. An assembly as defined in claim 5 including a ring and spring means acting on said ring to urge said brake elements into no-back braking pressure engagement, and motion-transmitting members extended between the disc connected to the output shaft and ring to shift said ring against the force of the spring means to reduce the brake pressure engagement as the space increases between said discs.

8. An assembly as defined in claim 7 wherein a member carried by the output shaft provides a reaction member for the brake elements upon pressure engagement for torque limiting.

9. An assembly for transmitting a drive from an input shaft to an output shaft and responsive to torque comprising, a brake for the output shaft, a yieldable direct drive connection between the input and output shafts which is independent of said brake, means for normally applying the brake to hold the output shaft against rotation and for progressively releasing the brake upon input shaft torque establishing a torque difference between the input and output shafts, and means for applying the brake as the torque difference between said shafts increases and approaches a maximum value.

10. An assembly as defined in claim 9 wherein said brake includes brake elements, said first-mentioned means includes a spring acting on the brake elements, said yieldable direct drive connection includes a pair of discs in opposed relation with one on each of the input and output shafts and an inclined ball ramp section on each disc with a ball positioned therebetween, and said second mentioned means includes additional ball ramp sections at a greater inclination.

11. A combination no-back brake and torque limiter assembly comprising, a casing, a rotatable input shaft and a rotatable output shaft mounted in said casing, a pair of discs carried one by each of said shafts and having faces in opposing relation, brake means associated with the output shaft including a first series of spaced-apart brake plates keyed to said casing and a second series of brake plates interleaved with the first series and keyed to the output shaft, spring means and a ring carried by the output shaft and acting against a brake plate of the second series to urge the brake plates toward the disc on the output shaft and into no-back pressure engagement, said discs having pairs of opposed ball ramps with each pair having a ball positioned therebetween, each of said ramps having a bottom whereby, with the balls positioned in said bottoms, the discs are in a minimum distance relation to establish the no-back brake condition, said ramps having a first section at a small angle to the face of the discs whereby, as the applied torque increases, the discs are separated to a brake null position by movement of the disc connected to the output shaft, said ramps having a second section at a greater angle to cause further separation of said discs to a torque limiting position by further movement of the disc on the output shaft, motion-transmitting pins extending between said disc on the output shaft and said ring to have said ring follow the movement of the last-mentioned disc; and reaction means on the output shaft against which the brake plates are pressed in the torque limiting operation.

12. A combination no-back brake and torque limiter assembly comprising, a casing, a rotatable input shaft and a rotatable output shaft mounted in said casing, an input disc on the input shaft and output disc on the output shaft and said discs having faces in opposing relation, brake means associated with the output shaft including a first series of spaced-apart brake elements keyed to said casing and a second series of brake elements interleaved with the first series and keyed to the output shaft, spring means and a ring carried by the output shaft and acting against a brake element of the second series to urge the brake elements toward the output disc and into no-back pressure engagement, said discs having pairs of opposed ball ramps with each pair having a ball positioned therebetween, each of said ramps having a bottom whereby, with the balls positioned in said bottoms, the discs are in a minimum distance relation to establish the no-back brake condition, said ramps having a first inclined section whereby, as the applied torque increases, the discs are separated to a brake null position by movement of the output disc, said ramps having a second inclined section to cause further separation of said discs to a torque limiting position by further movement of the output disc, motion-transmitting pins extended between said output disc and said ring to have said ring follow the movement of the output disc; and reaction means on the output shaft against which the brake elements are pressed in the torque limiting operation.

13. A combination no-back brake and torque limiter assembly comprising, a casing, a rotatable input shaft with a disc and a rotatable output shaft with a disc mounted in said casing, said discs having faces in opposing relation, brake means associated with the output shaft and the casing, a spring-urged member carried by the output shaft and acting against the brake means to urge the brake means toward the output disc and into no-back pressure engagement, said discs having a pair of opposed ball ramps and a ball positioned therebetween, each of said ramps having a bottom whereby, with the ball positioned in said bottoms, the discs are in a minimum distance relation to establish the no-back brake condition, said ramps having a first inclined section whereby, as the applied torque increases, the discs are separated to a brake null position by movement of the output disc, said ramps having a second inclined section to cause further separation of said discs to a torque limiting position by further movement of the output disc, motion-transmitting members extended between said output disc and said spring-urged member to have said member follow the movement of the output disc; and reaction means on the output shaft against which the brake elements are pressed in the torque limiting operation.

14. A combination no-back brake and torque limiter assembly comprising, a casing, a rotatable input shaft and a rotatable output shaft mounted in said casing, a pair of discs carried one by each of said shafts and having faces in opposing relation, said disc on the output shaft being movable linearly thereof, brake means associated with the output shaft including a first series of spaced-apart brake plates keyed to said casing and a second series of brake plates interleaved with the first series and keyed to the output shaft, spring means and a ring carried by the output shaft and the spring means acting on the ring to urge the ring and brake plates toward the disc on the output shaft and into pressure engagement with each other for no-back brake action, reaction means on the output shaft positioned to a side of said brake plates opposite said disc on the output shaft, said discs having pairs of opposed ball ramps with each pair having a ball positioned therebetween, each of said ramps having a bottom whereby, with the balls positioned in said bottoms, the discs are in a minimum distance relation to establish the no-back brake condition, said ramps having a first section at a small angle to the face of the discs whereby, as the applied torque increases, the discs are separated to a brake null position by movement of the disc connected to the output shaft linearly thereof, said ramps having a second section at a greater angle to cause further separation of said discs to a torque limiting position by further movement of the disc on the output shaft, and motion-transmitting pins extending between said disc on the output shaft and said ring to have said ring follow the movement of the last-mentioned disc whereby the initial separation of the discs moves the ring against the force of the spring means to release the pressure engagement between the brake plates and said further separation of said discs moves the ring further against the force of the spring means and forces the brake plates into pressure engagement with each other by engagement thereof with said reaction means.

* * * * *